Oct. 2, 1945.　　F. D. KNOBLOCK　　2,385,864
DIFFERENTIAL MECHANISM
Filed June 17, 1943　　2 Sheets-Sheet 2
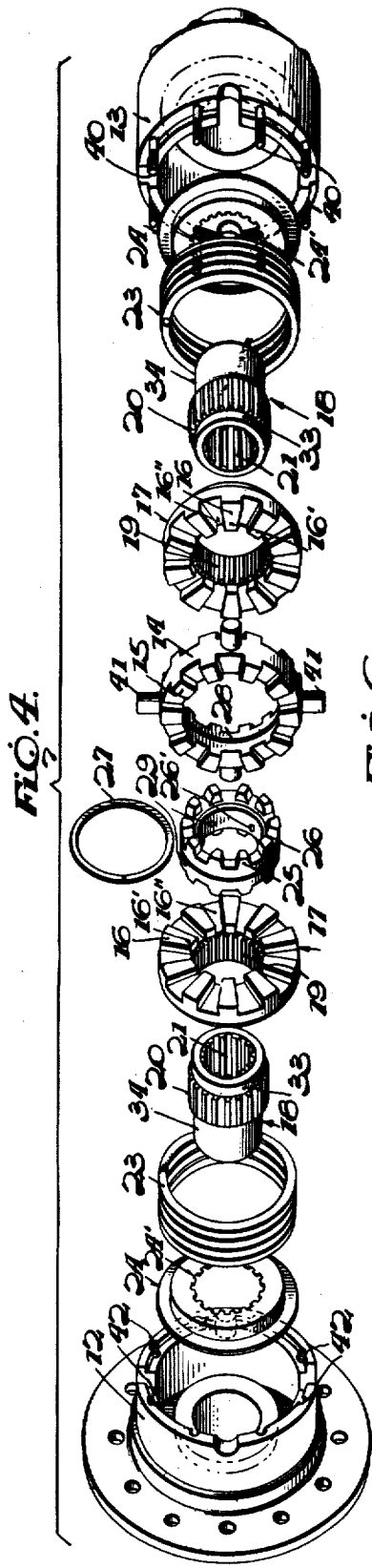
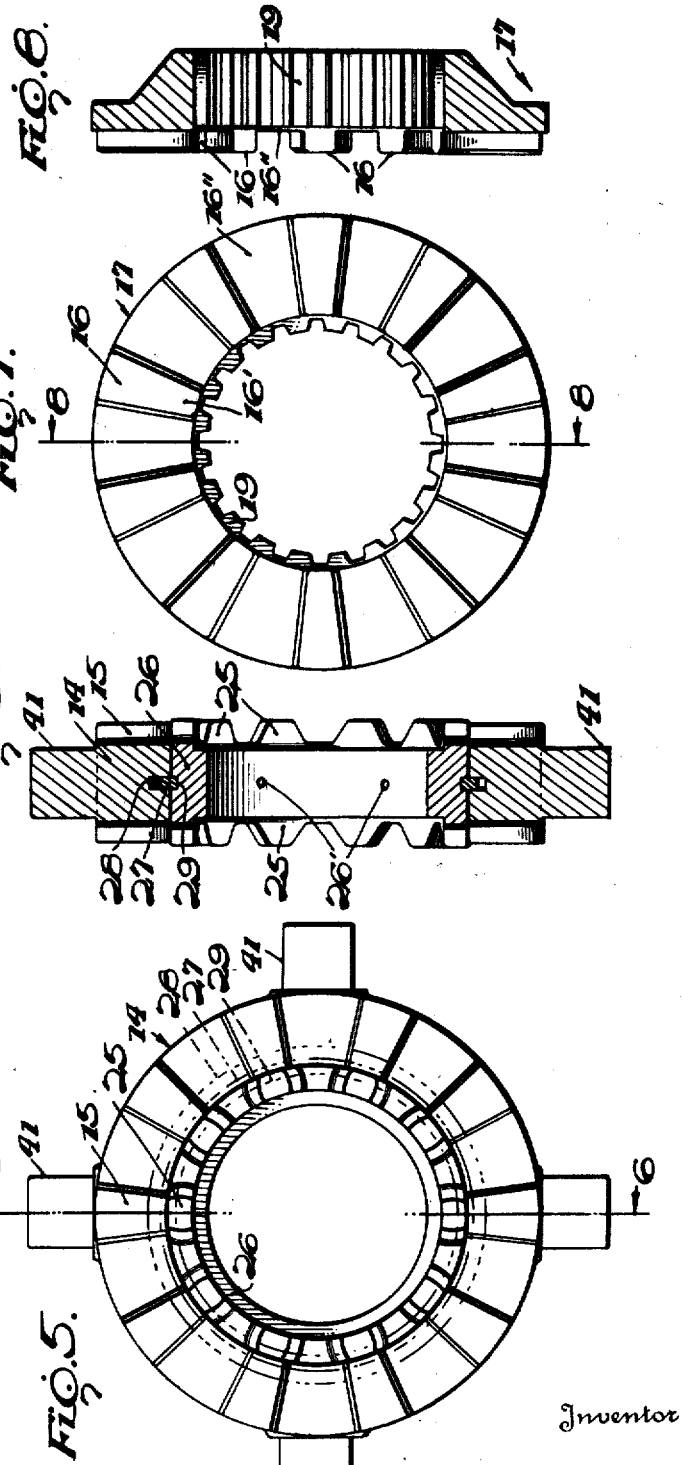
Inventor
Frederick D. Knoblock.
By Cameron, Kerkam + Sutton
Attorneys Patented Oct. 2, 1945

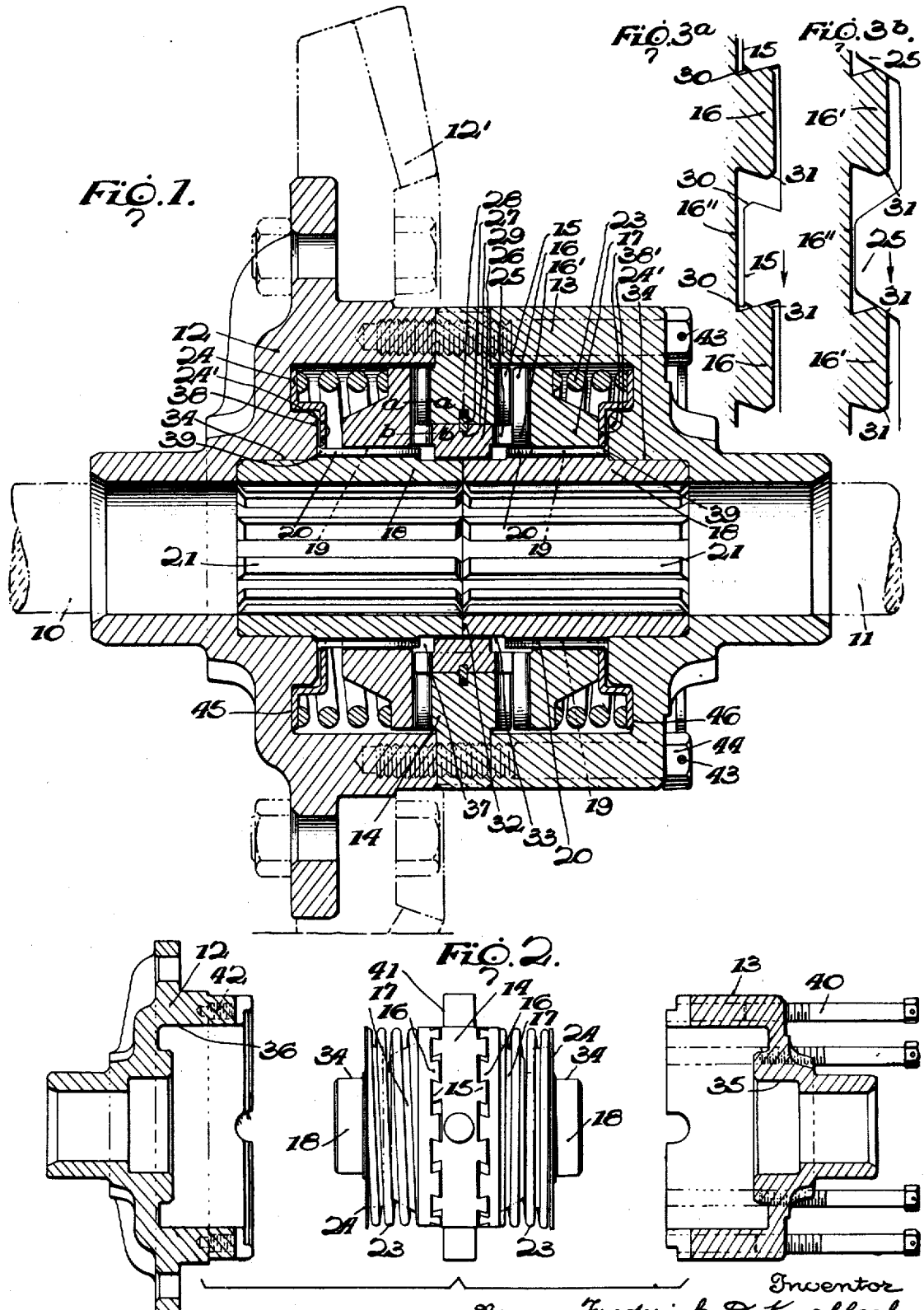

2,385,864

UNITED STATES PATENT OFFICE 2,385,864

DIFFERENTIAL MECHANISM

Frederick D. Knoblock, Birmingham, Mich., assignor, by mesne assignments, to Patent Developers, Inc., Detroit, Mich., a corporation of Michigan Application June 17, 1943, Serial No. 491,189

2 Claims. (Cl. 74—389.5)

The present invention is an improvement in differentials or axle compensators for two opposed shafts.

The principal objects of the invention are to provide a differential which is smaller, simpler, cheaper to manufacture, more durable in operation and more readily fabricated, as well as requiring less metal than other differentials now being used.

These objects are attained in part by providing the driven clutch members with teeth each of which has an integral clutch surface or section and an uninterrupted straight line extension the edges of which are engaged by the driving cam member in the disengaging operation. This construction eliminates a driven cam member and also the necessity for separately machining cam sections or surfaces either as an integral part of the driven clutch member or as a separate part which is later secured, as by hydrogen-brazing, to the driven clutch member.

In addition the present construction makes it possible to fabricate the driven clutch member with a smaller outside diameter or, for the same outside diameter, with more clutch tooth-bearing area, which increases the durability and life of the differential.

The invention will be better understood by reference to the accompanying drawings, illustrating one embodiment of the inventive idea, and wherein Fig. 1 is a sectional view through the differential and housing, the ring gear being shown in dotted lines;

Fig. 2 shows the casing, the cover and the subassembly separated;

Fig. 3a is a section on line a—a of Fig. 1;

Fig. 3b is a section on line b—b of Fig. 1;

Fig. 4 is an exploded view of the parts of the differential;

Fig. 5 is a face view of one of the driving clutch members together with the associated clutch disengaging member;

Fig. 6 is a section on line 6—6 of Fig. 5;

Fig. 7 is a face view of one of the driven clutch members illustrating the clutch tooth arrangement; and Fig. 8 is a section on the line 8—8 of Fig. 7.

Referring to the drawings, wherein like reference numerals indicate like parts, 10 and 11 are adjacent ends of two opposed shafts on which the differential or compensator is mounted; 12 is the casing or housing carrying the usual ring gear shown in dotted lines at 12' and 13 is the cover for the casing 12.

A suitable driving member which is preferably a central spider 14 is mounted in the housing and rotates therewith. This spider is provided on each face with driving clutch teeth 15 that engage driven clutch teeth 16 formed on two driven clutch members 17 one of which is associated with the shaft 10 and the other with shaft 11. Each driven clutch member 17 is mounted on a sleeve 18 and is slidable therealong by the provision of splines 19 on the driven clutch members 17 engaging splines 20 on said sleeves 18. Sleeves 18 are preferably provided with a second set of splines 21 that engage splines (not shown) on shafts 10 and 11, though said sleeves may be keyed to said shafts or otherwise secured thereto.

The clutch disengaging operation is effected when there is relative speed between the two shafts 10 and 11 which causes one or the other of driven clutch members 17 to slide axially outward along its associated sleeve member 18 as shown at the right-hand side in Fig. 1. This movement compresses one of the two coiled springs 23 which reacts between its associated driven member 17 and spring retainer 24. One driven clutch member 17 may be fully disengaged at the same time the other is fully disengaged under certain conditions.

The clutch disengaging operation is effected by cam teeth 25 formed on a clutch disengaging member 26 mounted within the spider or driving clutch member 14. This clutch disengaging member 26 is rotatable relative to the spider or driven clutch member 14 but is prevented from axial movement relative thereto by suitable retaining means such as a snap ring 27 engaging a groove or recess 28 in spider 14 and a registering groove or recess 29 in clutch disengaging member 26. The clutch disengaging member 26 is provided with a plurality, preferably four, of openings 26' through which the snap ring 27 may be engaged and forced outwardly from groove 29 into groove 28 so that member 26 may be disassembled from spider 14 by axial movement. Such a removable connection between the driving clutch member 14 and the clutch disengaging member 26 facilitates production and assembly and disassembly of the parts.

The cam teeth 25 on the clutch disengaging member 26 engage the edges 31 of the portions 16' which are integral aligned extensions of the sides and face of driven clutch teeth 16, the coaction being such that when there is relative speed between the shafts 10 and 11 a declutching action is effected by the pressure of cam teeth 25

(Fig. 3b) on the edges 31 which moves the clutch teeth 16, 16' into disengaging position as shown in Fig. 1.

Heretofore the cam teeth or surfaces associated with the driven clutch members 17 have either been separately machined on the driven clutch member or formed on a separate piece and then hydrogen-brazed or otherwise secured to the driven clutch member; but I have discovered that the construction and production can be simplified and cheapened, driven cam teeth or surfaces eliminated, and other desirable objects obtained by forming the driven clutch teeth 16 with an integral prolongation the edges of which are engaged by the driving cam tooth 26 in the disengaging action. Each tooth 16, 16' on this driven clutch member 17 can be machined at one operation as the portion 16' is a prolongation or extension of the clutch portion 16 on both the face and sides and edges. The construction is clearly shown in Figs. 1, 3a, 3b, 4 and 7. In the prior art there is a driving cam member which is associated with a driven cam member. In the present construction the driving cam member 26 is the only cam member inasmuch as the edges 31 on projections 16' that cooperate with the teeth on member 26 have no camming function which function is alone performed by the camming teeth 26.

In Fig. 1 the combined clutch section 16 and section 16' is shown in elevation, this view illustrating the vertical alignment of the front face of the clutch section 16 and section 16' with respect to an associated driving clutch tooth 16 and clutch disengaging cam tooth 26. Fig. 4 shows in perspective and Fig. 7 in face view the tapered shape of the combined tooth 16 and 16'. Figs. 3a and 3b are sectional developments along the lines a—a and b—b, respectively, of Fig. 1. Fig. 3a shows the engagement of two driven clutch surfaces 16 with two driving clutch teeth 16; and Fig. 3b shows the engagement of two edges 31 on the portions 16' of the driven clutch member with two cam teeth 26 on the clutch disengaging member 26. The edges of the driving clutch teeth 16 are beveled at 30 and the edges of each combined tooth 16 and 16' are beveled at 31 to facilitate the meshing and demeshing action, reduce backlash, and protect the teeth from chipping by eliminating sharp edges that become brittle by heat treatment.

The two sleeves 18 in the position shown in Fig. 1 are arranged to abut each other at 32 to permit maximum spline engagement with the axle shafts 10 and 11. Said sleeves are provided with plane surfaces 33 and 34 adjacent the splines 20. The plane surface 34 on the right-hand sleeve 18 is journalled in the recess 35 (Fig. 2) in the cover 13 and the plane surface 34 on the left-hand sleeve 18 is journalled in the recess 36 (Fig. 2) in the casing 12. The adjacent surfaces 33 on the two sleeves 18 are plane to provide a clearance 37 (Fig. 1) in which the clutch disengaging member 26 is free to rotate relative to the spider 14. This arrangement of the sleeves 18 insures that any end thrust thereon during assembly with the shafts 10 and 11 is immediately imparted from one to the other to the casing or the cover and thus protects the component parts of the differential.

It will be noted from an inspection of Fig. 1 that the part 24' of each spring retainer 24 is internally splined to receive the external splines 20 on the sleeves 18. This construction prevents the spring 23 from taking torque at any time. The spring retainer thrusts against the recesses 45 and 46 machined in the differential case halves 12 and 13. One variation in the design of the spring retainer 24 is to have its inner part 24' such that there is a clearance between it and the inner surface 38 of casing 12 and 38' of cover 13 when the differential is completely assembled. This clearance is to provide a space for the burring or spot-welding of the outer ends 39 of the splines 20 on the sleeves 18, which burring or spot-welding prevents outward longitudinal movement of the retainers 24 and insures the maintenance in position of the component parts of a subassembly comprising the spider 14, clutch disengaging member 26, driven clutch members 17, springs 23 and spring retainers 24 when these parts are separated from the casing 12 and cover 13 as shown in Fig. 2. Such a subassembly greatly facilitates assembly and disassembly, it being only necessary to introduce the subassembly into the casing 12, and fasten the cover 13 thereon by any suitable means such as screw-threaded bolts 40 carried by the cover 13 and passing into screw-threaded recesses 42 in the casing. Accidental unscrewing of the bolts 40 is prevented by passing a wire 43 through openings in the heads 44 of the bolts 40, and binding the free ends of said wire in any suitable fashion.

The present construction provides a simple, small, efficient, cheap and durable axle differential or compensator that can be readily produced and assembled and disassembled.

It will be understood that while one embodiment of the inventive idea has been illustrated and described in detail such idea is susceptible of other mechanical embodiments within the scope of the appended claims.

What is claimed is:

1. In a differential adapted to be mounted in a casing and of the type comprising a driving clutch member, a clutch disengaging member, driven clutch members, a spring and a spring retainer associated with each driven clutch member and a sleeve on which each driven clutch member is mounted, the provision of splines on each driven clutch member engaging splines on its associated sleeve the outer ends of said splines being upset to hold said parts together as a subassembly when removed from the casing.

2. In a differential of the type comprising a member provided with driving clutch teeth, a clutch disengaging member rotatable therein and relatively thereto and provided with cam teeth, and a driven clutch member provided with clutch teeth, the improvement which consists of a driven clutch member provided with a plurality of teeth each of which has a clutch surface to transmit the driving torque and the edges of which teeth are extended radially to engage said cam teeth the edges of said teeth being beveled to reduce back-lash in the clutching region and to reduce wear in the region where they engage said cam teeth.

FREDERICK D. KNOBLOCK.